Figure 1:
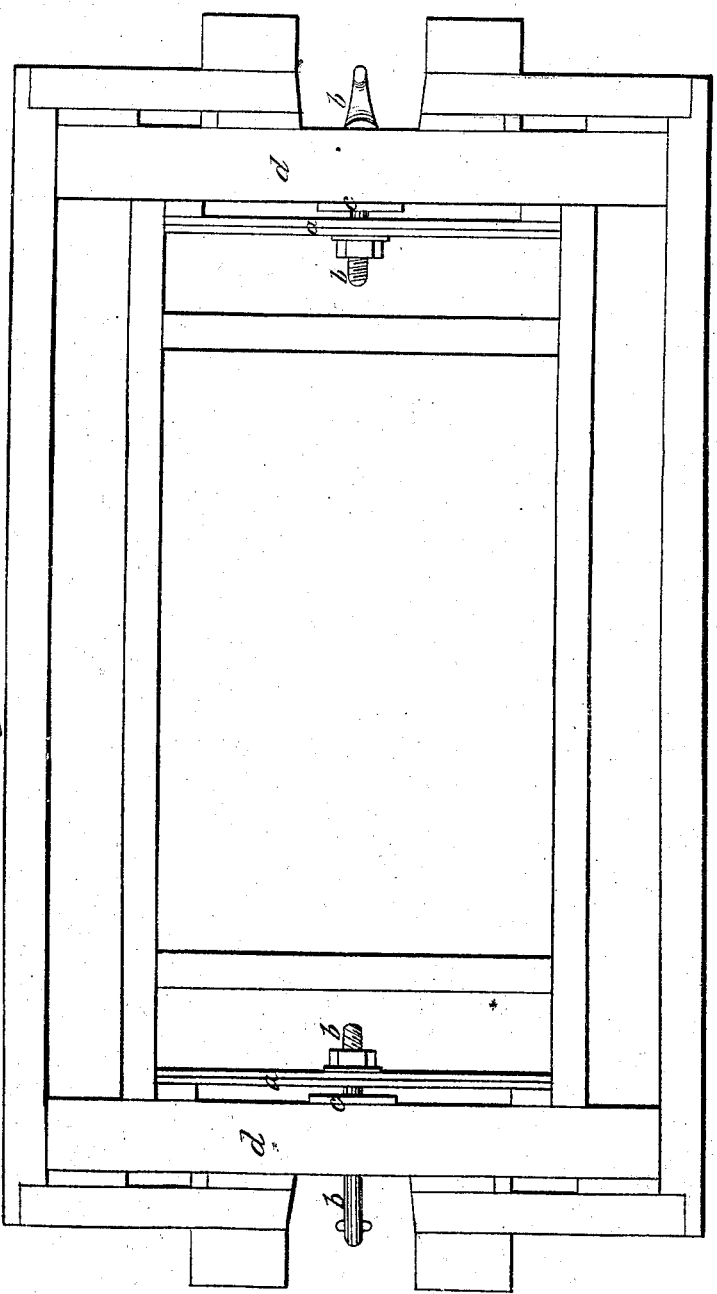

R. A. WILDER.
DRAW SPRING FOR RAILROAD CARS.

No. 38,618.

Patented May 19, 1863.

Witnesses
John McCollin
Wm Carter

Inventor
R. A. Wilder

UNITED STATES PATENT OFFICE.

R. A. WILDER, OF CRESSONA, PENNSYLVANIA.

IMPROVEMENT IN DRAW-SPRINGS FOR RAILROAD-CARS.

Specification forming part of Letters Patent No. 38,618, dated May 19, 1863.

*To all whom it may concern:*

Be it known that I, R. A. WILDER, of the borough of Cressona, in the county of Schuylkill and State of Pennsylvania, have invented a new and Improved Mode of Making the Draw-Springs of Railroad-Cars; and I do hereby declare that the following is a full and exact description thereof, reference being had to the accompanying drawing, and to the letters of reference marked thereon.

The nature of my invention consists in the combination of a draw-bar and a spring made of wood, forming a cheap and efficient mode of preventing the shock in starting the cars.

Figure 1 represents the bottom frame-work of a car with the spring and draw-bar attached.

$a$ is the spring of wood. $b\ b$ is the draw-b r. $c$ is a piece of gum or any other elastic material placed between the car-sill $d$ and the wooden spring $a$ to assist in preventing the shock. This, however, is not always essential.

To enable others skilled in the art to make and use my invention, I will proceed to describe its construction and operation.

I construct my draw-spring by attaching one or more pieces of elastic timber to the inside of the end sill of a railroad-car, with blocks of the desired thickness and form at the ends of the spring, to give space between the spring and sill to secure the free movement of the former. I then pass the draw-bar through the end sill, giving it sufficient room to move freely, and fasten it to the back of the spring by any secure method.

The operation of the spring and draw-bar will be clearly understood by reference to the drawing.

What I claim as my invention, and desire to secure by Letters Patent, is—

The combination of the wooden spring $a$ and the draw-bar $b\ b$, constructed and operating substantially as described.

R. A. WILDER.

Witnesses:
 JOHN MCCOLLINS,
 D. H. ALBRIGHT.